United States Patent [19]
Tanaka et al.

[11] Patent Number: 5,738,327
[45] Date of Patent: Apr. 14, 1998

[54] VEHICULAR SEAT ADJUSTER

[75] Inventors: Yuji Tanaka; Koichi Iwasaki, both of Ayase, Japan

[73] Assignee: Ikeda Bussan Co., Ltd., Ayase, Japan

[21] Appl. No.: 605,740

[22] Filed: Feb. 22, 1996

[30] Foreign Application Priority Data

Feb. 28, 1995 [JP] Japan ................................. 7-063535

[51] Int. Cl.$^6$ ........................................ F16M 13/00
[52] U.S. Cl. ........................... 248/419; 248/395; 297/330
[58] Field of Search ............................. 248/419, 157, 248/420, 421, 422, 423, 393, 395, 429; 297/330; 296/65.1

[56] References Cited

U.S. PATENT DOCUMENTS

| | | | |
|---|---|---|---|
| 3,923,408 | 12/1975 | Belsdorf | 403/261 |
| 4,781,353 | 11/1988 | Nishino | 248/395 |
| 4,818,166 | 4/1989 | Szukay et al. | 411/361 |
| 5,267,717 | 12/1993 | Isomura | 248/419 X |
| 5,275,457 | 1/1994 | Satoh et al. | 248/419 X |
| 5,501,422 | 3/1996 | Chinomi | 248/419 |

FOREIGN PATENT DOCUMENTS

| | | |
|---|---|---|
| 0 548 924 A1 | 6/1993 | European Pat. Off. . |
| 2 105 839 | 4/1972 | France . |
| 30 04 367 A1 | 9/1980 | Germany . |
| 34 12 156 A1 | 10/1985 | Germany . |
| 2 081 082 | 2/1982 | United Kingdom . |

*Primary Examiner*—Ramon O. Ramirez
*Attorney, Agent, or Firm*—Foley & Lardner

[57] ABSTRACT

A seat adjuster of a vehicular seat is provided with a seat lifting mechanism which includes front and rear shafts which are supported to vertically extending walls of a pair of seat rails for sliding a vehicular seat. One end portion of each shaft has a bulged portion for receiving the wall and a groove for setting a stop ring. The end portion is inserted to a through-hole of the wall and limitingly connected thereto by means of the bulged portion and the stop pin set in the groove.

8 Claims, 4 Drawing Sheets

5,738,327

1

VEHICULAR SEAT ADJUSTER

BACKGROUND OF THE INVENTION

1. Field of the Invention

The present invention relates to improvements in a seat adjuster which comprises a seat slide mechanism and a seat lifting mechanism.

2. Description of the Prior Art

A variety of seat adjusters have been proposed and in practical use. FIGS. 7 and 8 show a typical seat adjuster which has a pair of lower base members 2D, 2D fixed to a seat side rail 1 and a pair of upper base members 2U, 2U fixed to a seat cushion fame 3. Front and rear shaft members 4F and 4R are laterally disposed at front and rear ends of the lower base members 2D, respectively. Front and rear supporting links 5F and 5R are connected with the shaft members 4F and 4R, respectively. Two output shafts 6a, 6a of a drive unit 6 are interconnected with the shaft members 4F and 4R through transmission links 7F and 7R, respectively. Each of the first and second shaft members 4F and 4R has a pair of end portions which are inserted to the respective through-holes 2a, 2a of the lower base members 2D, 2D. As shown in FIG. 8, one end portion of each shaft member 4F, 4R is provided with a cylindrical stopper 8 fixedly welded thereto and d groove 10 for setting an E-shape ring 9. The other end portion of each shaft member 4F, 4R has no stopper and no groove. When the front and rear shaft member 4F and 4R are installed to the lower base members 2D, 2D, the other end portion is first inserted to the through-hole 2a of one of the lower base members 2D, 2D, and the worked end portion of each shaft member 4F, 4R is then inserted to the through-hole 2a of the other lower base member 2D so that the stopper 8 contacts with an inner surface of the lower base member 2D. Then, the E-shape ring 9 is installed to the groove 10 so that the front and rear shaft members 4F and 4R are rotatably supported to the lower base member 2D and 2D while being limited in axial movement.

However, the above-mentioned installation structure of the shaft members is complicated and requires a complicated working. Further, since the stopper is connected to the shaft member 4F, 4R by means of welding, a positioning accuracy of the stopper is not so high.

SUMMARY OF THE INVENTION

It is an object of the present invention to provide an improved a vehicular seat adjuster which realizes the reduction of cost in parts and in working, while improving the accuracy of the position of a stopper.

A seat adjuster according to the present invention is for a vehicular seat and comprises a rail unit for adjustably sliding the vehicular seat in the .fore-and-aft direction. The rail unit includes a floor rail which is fixed on a floor of a vehicle body and a seat rail which is engaged with the floor rail so as to be slidable in the fore-and-aft direction of the vehicle. A seat lifting mechanism is fixed on the seat rail and includes a lifting drive unit which is operated according to a request of a seat occupant, a front lifting unit which is disposed under a front portion of the seat and vertically moves the seat front portion according to the operation of the lifting drive unit, and a rear lifting unit which is disposed under a rear portion of the seat and vertically moves the seat rear portion according to the operation of the lifting drive unit. Each of said front and rear lifting units includes a shaft member which is supported to the seat rail and has a supporting link interconnected to the seat. The shaft member has a first stopper integral with said shaft member and a second stopper constituted by a groove portion and a stopping part set to the groove portion. A supporting portion of the seat rail is disposed between the first and second stopper.

BRIEF DESCRIPTION OF THE DRAWINGS

In the drawings, like reference numerals designate like parts and elements throughout all figures, in which.

DETAILED DESCRIPTION OF THE INVENTION

Figure 1:
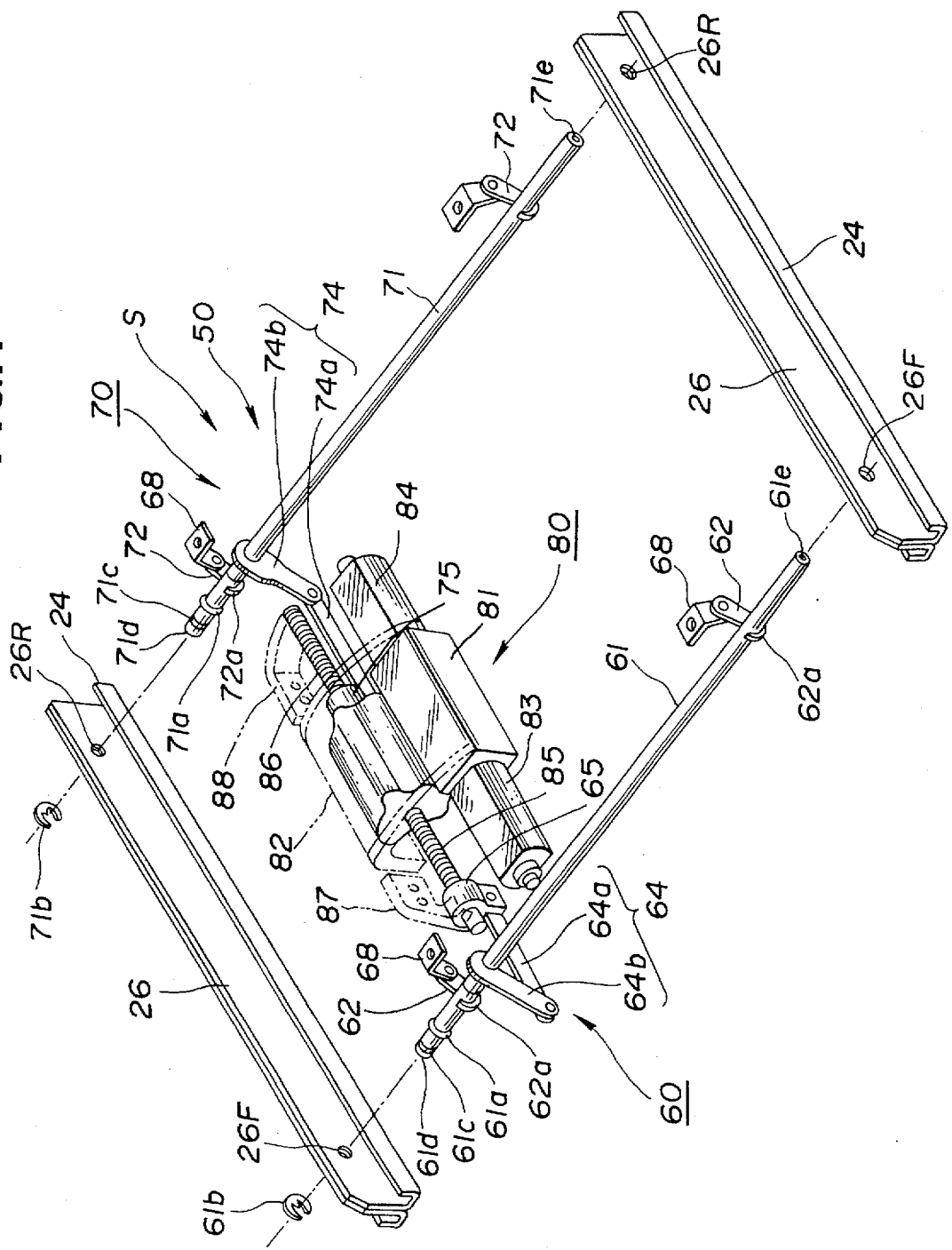
FIG. 1 is an exploded perspective view which shows a lifting mechanism of a first embodiment of a seat adjuster according to the present invention.
Figure 2:
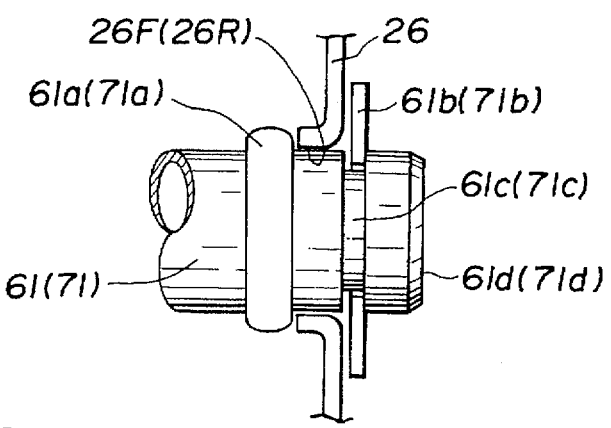
FIG. 2 is a partial side view of a shaft member of the seat adjuster of FIG. 1.
Figure 3:
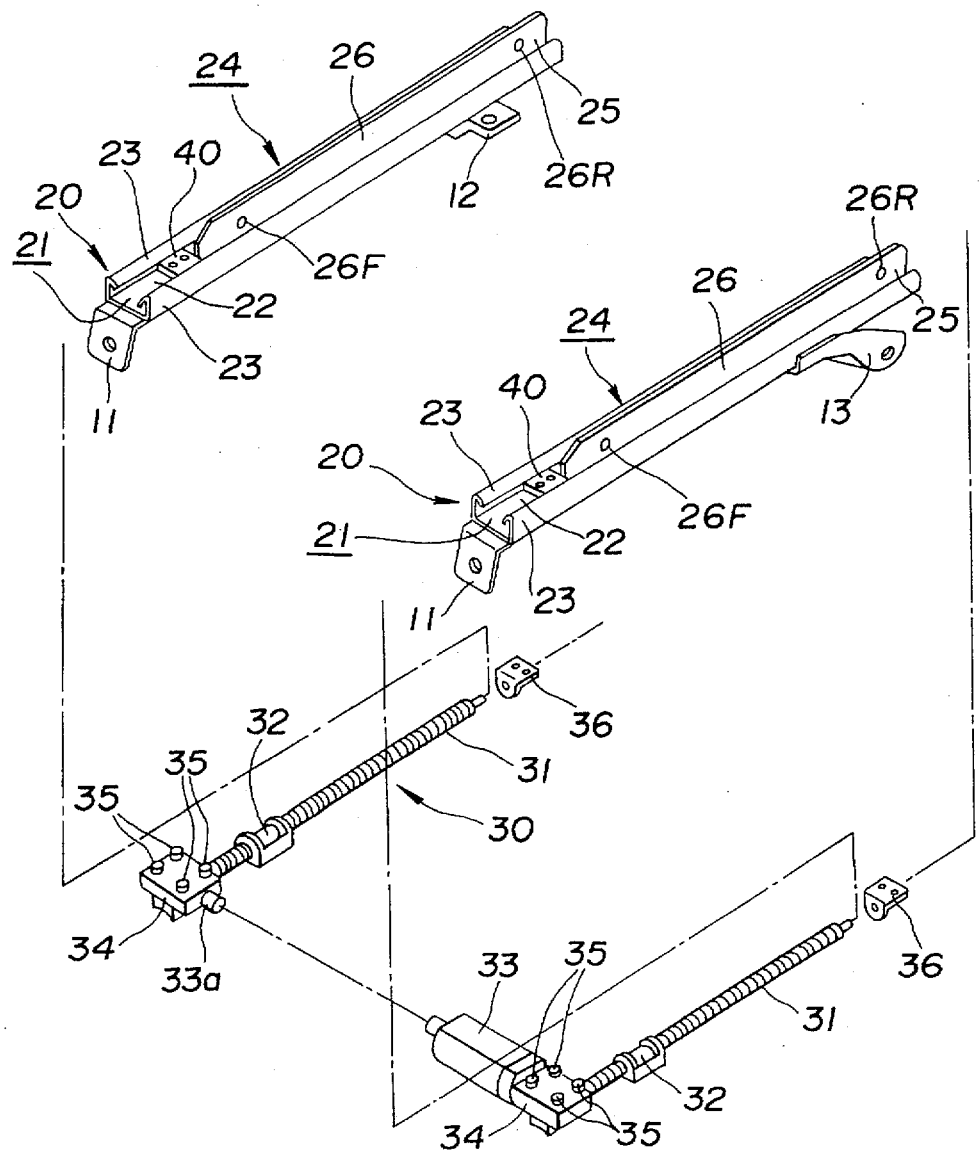
FIG. 3 is an exploded perspective view of a rail unit of the first embodiment of the seat adjuster according to the present invention.

Referring now to FIGS. 1 to 3, there is shown a first embodiment of a vehicular seat adjuster S according to the present invention.

As shown in FIGS. 1 to 3, the seat adjuster S for a vehicular seat comprises a pair of rail units 20 and 20 which are disposed parallel under the respective lateral sides of a seat (not shown) and a seat lifting mechanism 50 which is disposed between the rail units 20 and 20 and the seat, and supports the seat so as to be vertically movable relative to the rail units 20. As shown in FIG. 3, each rail unit 20 comprises a floor rail 21 which is fixed on a vehicle floor through leg members 11 and 12 (or 13), and a seat rail 24 which is slidably engaged with the floor rail 21 and supports the seat. The floor rail 21 has a bottom portion 22 and a pair of side wall portions 23, and forms a channel in cross-section. The seat rail 24 comprises a sliding portion 25 which is slidably engaged with the floor rail 21 and a perpendicular plate portion 26 which is perpendicularly fixed to the sliding portion 25 and which has front and rear through-holes 26F and 26R to which front and rear shaft members are installed.

The rail units 20 comprise a rail drive unit 30 for sliding the seat rail 24 relative to the floor rail 21 in the fore-and-aft direction of the vehicle. The rail drive unit 30 comprises a pair of screw members 31 which are disposed in the spaces between floor rails 21 and each seat rail 24, respectively, in the fore-and-aft direction. A pair of nut members 32 are rotatably screwed on the screw members 31, respectively. A pair of gear boxes 34 are connected to the screw members 31, respectively. The gear box 34 functions to change a rotational speed to be applied to the screw member 31 from an electric motor 33. The from end of the screw member 31 is supported by the gear box 34. The gear box 34 is fixed to the perpendicular plate portion 26 of the seat rail 24 through an installation member 40. Four projections 35 are fixedly connected on the gear box 34 and function to fix the gear box 34 to the installation member 40 of the seat rail 24. The electric motor 33 is integrally connected to a side wall of one of the gear boxes 34 and connected to the other gear box 34 through a direct driving shaft 33a. On the other hand, a rear end of the screw member 31 is supported by an inner portion of the sliding portion 25 through each supporting bracket 36. A nut member 32 screwed with each screw member 31 is fixed with the bottom portion 22 of the floor rail 21 so as not to be movable in the fore-and-aft direction and not to be rotated with the screw member 31. The rail drive unit 30 is operated by a seat occupant so as to adjust the seat in the fore-and-aft direction.

As shown in FIG. 1, the seat lifting mechanism 50 comprises a front lifting unit 60, a rear lifting unit 70 and a lifting drive unit 80. The front lifting unit 60 is disposed under a front side of the seat to vertically adjust the front portion of the seat. The rear lifting unit 70 is disposed under a rear side of the seat to vertically adjust the rear portion of the seat. The lifting drive unit 80 is disposed between the front lifting unit 60 and the rear lifting unit 70. The lifting drive unit 80 functions to vertically move the front and rear lifting units 60 and 70.

The front lifting unit 60 comprises a front shaft member 61, a pair of supporting links 62 and 62 and a front transmission link 64. The front shaft member 61 is made of a straight pipe and is laterally disposed between the perpendicular plate portions 26 of the respective seat rails 24. The pair of supporting links 62 are fixed at both end portions of the front shaft member 61, respectively, so as to swing upward or downward according to the rotational direction of the front shaft member 61. The front transmission link 64 interconnects the front shaft member 61 and the lifting drive unit 80 and functions to transmit the motive power of the lifting drive unit 80 to the front shaft member 61 in order to rotate the front shaft member 61. The front transmission link 64 for transmitting the motive power of the lifting drive unit 80 to the front shaft member 61 is interconnected with the front shaft member 61. The front transmission link 64 comprises a first transmission link member 64a which is directly driven by the lifting drive unit 80, and a second transmission link member 64b whose one end is rotatably connected with an end of the first transmission link member 64a and whose the other end is fixedly connected with the front shaft member 61. Accordingly, when the lifting drive unit 80 is operated, the front shaft member 61 is rotated through the front transmission link 64.

As shown in FIGS. 1 and 2, the front shaft member 61 has a first and second end portions 61d and 61e. At the first end portion 61d, a stopper portion 61a is formed by bulging an end portion 61d of the front shaft member 61 to form a diametrically bulged stopper portion. Further, at the end portion 61d of the front shaft member 61, a ring groove 61c is formed to have a distance corresponding to the thickness of the perpendicular plate portion 26 to the stopper portion 61a toward a tip end of the front shaft member 61. An E-shape ring 61b installed to the ring groove 61c in order to rotatably support the front shaft member 61 to the seat rails 24 and 24. On the other hand, the second end portion 61e of the front shaft member 61 has no stopper and no ring groove.

The supporting link 62 of a J-shape includes a circular arc portion 62a fixed to the front shaft member 61, as shown in FIG. 1. An opposite side to the circular arc portion 62a is rotatably connected to an installation bracket 68 which is fixed to a bottom portion of a cushion frame (not shown).

The rear lifting unit 70 comprises a rear shaft member 71, a pair of supporting links 72 and a rear transmission link 74.

The rear shaft member 71 is laterally disposed between the perpendicular plate portions 26 of the respective seat rails 24. The supporting links 72 are fixed at both end portions of the rear shaft member 71, respectively, so as to vertically swing according to the rotation of the rear shaft member 71. The rear transmission link 74 interconnects the lifting drive unit 80 and the rear shaft member 71, and functions to transmit the motive power of the lifting drive unit 80 to the rear shaft member 71 in order to rotate the rear shaft member 71.

The rear shaft member 71, the supporting link 72 and the transmission link 74 of the rear lifting unit 70 are the same as the corresponding parts of the front lifting unit 60, respectively. More particularly, the rear shaft member 71 has a first and second end portions 71d and 71e. At the first end portion 71d, a stopper portion 71a is formed by bulging the first end portion 71d of the rear shaft member 71 to form a diametrically bulged stopper portion. Further, at the end portion 71d of the rear shaft member 71, a ring groove 71c is formed to have a distance corresponding to the thickness of the perpendicular plate portion 26 to the stopper portion 71a toward a tip end of the front shaft member 71. An E-shape ring 71b is installed to the ring groove 71c in order to rotatably support the rear shaft member 71 to the seat rails 24 and 24. On the other hand, the second end portion 71e of the rear shaft member 71 has no stopper and no ring groove.

The rear transmission link 74 for transmitting the motive power of the lifting drive unit 80 to the rear shaft member 71 is interconnected with the rear shaft member 71. The rear transmission link 74 comprises a first transmission link member 74a which is directly driven by the lifting drive unit 80, and a second transmission link member 74b whose one end is rotatably connected with an end of the first transmission link member 74a and whose the other end is fixedly connected with the rear shaft member 71. Accordingly, when the lifting drive unit 80 is operated, the rear shaft member 71 is rotated through the rear transmission link 74.

In order to support the front and rear shaft members 61 and 71 to the seat rails 24 and 24, the end portions 61e and 71e of the front and rear shaft members 61 and 71 are respectively inserted to the through-holes 26F and 26R of the perpendicular plate portion 26 of the seat rail 24. Next, the other worked end portions 61d and 71d of the front and rear shaft members 61 and 71 are inserted to the through-holes 26F and 26R of the other seat rail 24, until the stopper portions 61a and 71a are in contact with the perpendicular sheet portion of the other seat rail 24. Then, the E-shape rings 61b and 71b are set to the ring grooves 61c and 71c, respectively.

As shown in FIG. 1, the lifting drive unit 80 has a gear box 81 which is fixed to the inner wall surface of the perpendicular plate portion 26 of the seat side rail 24. Front and rear driving motors 83 and 84 are installed to front and rear end surface of the gear box 81, respectively. The front and rear driving motors 83 and 84 are connected to front and rear driving screws 85 and 86. The rotations of the front and rear driving screws 85 and 86 move front and rear driving nuts 65 and 75 in the fore-and-aft direction.

The lifting drive unit 80 is located between the front and rear lifting units 60 and 70 and transmits motive power to the front and rear shaft members 61 and 71 of the front and rear lift units 60 and 70 through the respective transmission links 64 and 74. Each of base end portions of the front and rear driving screw shafts 85 and 86 is inserted into and supported by the gear box 81. Each tip end portion of the front and rear driving screw shafts 85 and 86 is supported to the inner wall surface of the perpendicular plate portion 26 of the seat rail 24 through each shaft support bracket 87, 88.

An end of the first transmission link member 64a is swingably supported to the front driving nut 65. The other end of the first transmission link member 64a is swingably connected to the second transmission link member 64b. Similarly, an end of the first transmission link member 74a constituting the transmission link 74 of the rear lifting unit 70 is swingably supported to the rear driving nut 75. The other end of the first transmission link member 74a is swingably connected to the second transmission link member 74b.

Accordingly, according to the fore-and-aft movements of the front and rear driving nuts 65 and 75, the supporting links 62 and 72 are swung upward or downward around the first and second shaft members 61 and 71 so as to vertically move the seat.

The manner of operation of the thus arranged seat adjuster 10 according to the present invention will be discussed hereinafter.

A seat cushion frame (not shown) of the seat slides with the seat lifting mechanism 50 in the fore-and-aft direction due to the sliding movement of the seat side rails 24 relative to the floor side rails 21. That is, the screw member 31 is connected to the seat rail 24 so as to be axially rotatable and fixed in the fore-and-aft direction while the nut member 32 is rotatable relative to the screw member 31 and fixed to the floor rail 21. Accordingly, the seat position in the fore-and-aft direction relative to the vehicle floor is properly adjusted when the electric motor is operated according to a request of a seat occupant.

In the seat lifting mechanism 50, the seat is moved upward and downward by the swinging movement of the transmission links 64 and 74 according to the operation of the lifting drive unit 80. More particularly, as shown in FIG. 1, when the front side driving nut 65 is rearwardly moved by the operation of the front side driving motor 83, the rear end of the supporting link 62 is upwardly swung, and therefore the front end portion of the seat is moved upward. On the other hand, when the rear side driving nut 75 is rearwardly moved by the operation of the rear side driving motor 84, the rear end of the supporting link 72 is upwardly swung, and therefore the rear end portion of the seat is moved upward. It is of course that such operations of the lifting drive unit 80 is implemented according to the request of the seat occupant.

It will be understood that the operations by the front side driving motor 83 or rear side driving motor 84 may be implemented independently or simultaneously. If the operations of the motors 83 and 84 are simultaneously implemented, the seat is vertically slid. If the operations of the motors 83 and 843 are independently implemented, the oblique angle in the fore-and-aft direction of the seat is changed.

With the first embodiment of the seat adjuster according to the invention, the stopper portions 61a and 71a are integrally formed with the front and rear shaft members 61 and 71, respectively. This largely decreases parts and working steps as compared with a conventional structure. Further, the stepper portions 61a and 71a can be formed at predetermined positions with high-accuracy.

Although the first embodiment of the invention has been shown and described such that the E-shape rings 61b and 71b are set to the ring grooves 61c and 71c, it will be understood that other rings such as C-shape rings may be used in stead of the E-shape rings.

Figure 4:
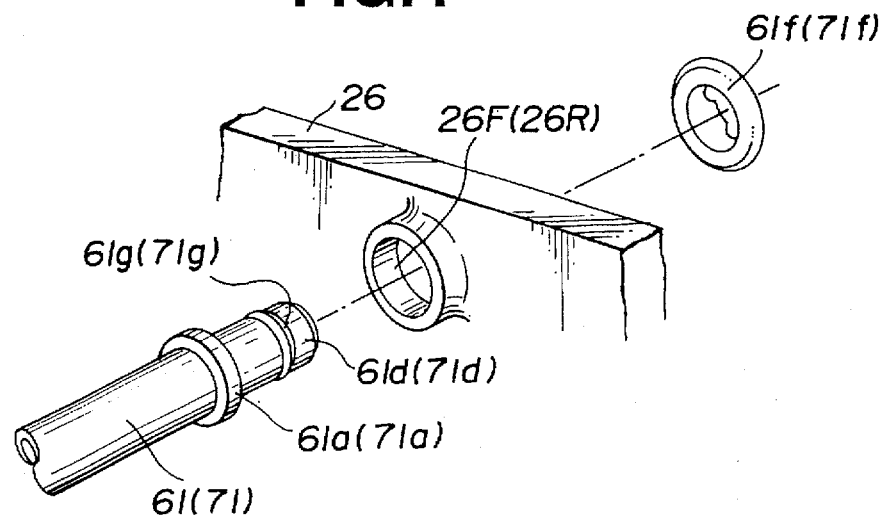
FIG. 4 is an exploded perspective view of an essential part of a second embodiment of the seat adjuster according to the present invention.
Figure 5:
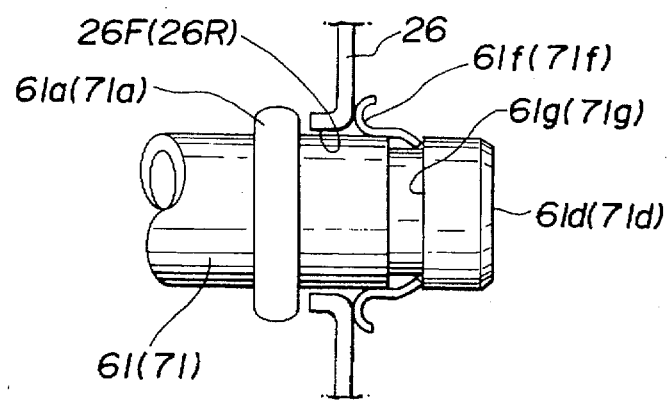
FIG. 5 is a partial side view of a shaft portion of FIG. 4.

Referring to FIGS. 4 and 5, there is shown a second embodiment of the seat adjuster according to the present invention. The structure of the second embodiment is generally similar to that of the first embodiment except that push nuts are used instead of the E-shape rings.

As shown in FIG. 4, a stopper portion 61a is formed by bulging so that a distance from the tip end of the front shaft member 61 is larger than that in the first embodiment. A push nut 61f is set to a groove 61g formed in the front shaft member 61 so that the push nut 61f pushing sandwiches the perpendicular sheet portion 2 with the stopper portion 61a of the front shaft member 61. As is similar to the front shaft member 61, a stopper portion 71a is formed in the vicinity of the rear shaft member 71 and a push nut 71f is set to a groove 71g.

In order to support the front and rear shaft members 61 and 71 to the seat rails 24 and 24, the end portions 61d and 71d are inserted to the through-holes 26F and 26R of the perpendicular plate portion 26 of the seat rail 24. Next, the other worked end portions 61d and 71d of the front and rear shaft members 61 and 71 are inserted to the through-holes 26F and 26R of the other seat rail 24, until the stopper portions 61a and 71a are in contact with the perpendicular sheet portion of the other seat rail 24. Then, the push nuts 61f and 71f are set to the grooves 61g and 71g, respectively.

With the second embodiment of the seat adjuster according to the present invention, the stopper portions 61a and 71a are integrally formed with the front and rear shaft members 61 and 71, respectively. Further, the setting of the front and rear shaft members 61 and 71 to the seat rails 24 and 24 is easily executed by pushing the push nuts 61f and 71f to the end portions 61d and 71d after the end portions 61d, 71d, 61d and 71d are inserted to the through-holes 26F, 26R, 26F and 26R, respectively. Therefore, it becomes possible to largely decrease parts and working steps as compared with a conventional structure.

Figure 6:
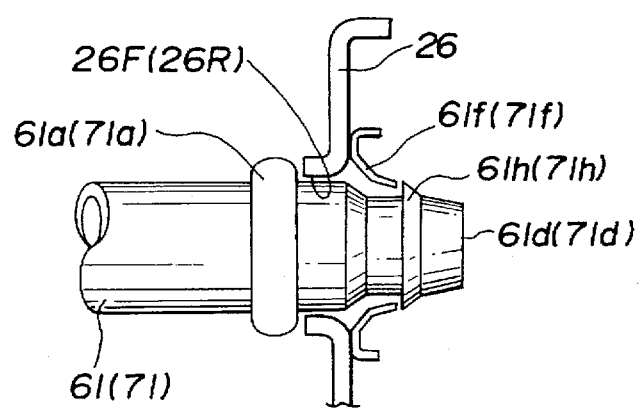
FIG. 6 is a partial side view of a modification of the shaft portion of FIG. 4.
Figure 7:
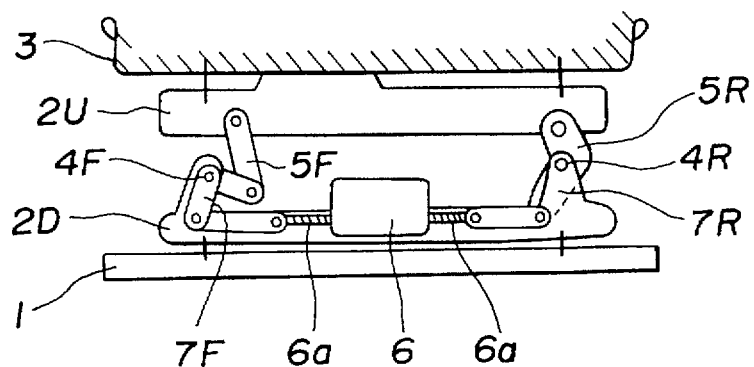
FIG. 7 is a side view of a conventional seat adjuster.
Figure 8:
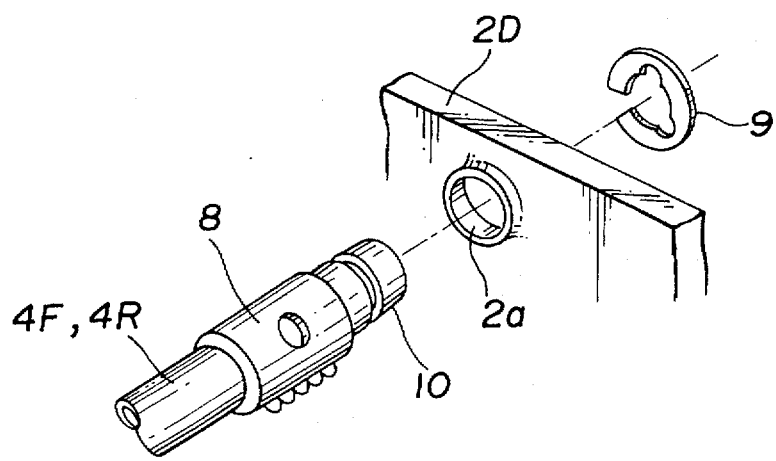
FIG. 8 is a perspective view of a shaft portion of the conventional seat adjuster.

Although the second embodiment of the invention has been shown and described such that the grooves 61g and 71g are formed to install the push nuts 61f and 71f, it will be understood that tapered projections 61h and 71h may be formed in stead of the grooves 61g and 71g, as shown in FIG. 6.

While the second embodiment has been shown and described such that the front and rear shaft members 61 and 71 are made from a pipe, it will be understood that the front and rear shaft members 61 and 71 may be formed from a bar material.

Furthermore, although the first and second embodiments of the invention have been shown and described such that the stopper portions 61a and 71a are disposed inside of the perpendicular plate portion 26 of the seat rail 24 and the grooves 61c, 61g, 71c and 71g are formed outside of the perpendicular plate portion 26 of the seat rail 24, it will be understood that the positioning of the stopper portions and the grooves of the invention is not limited to the first and second embodiments and may be arranged such that the stopper portions 61a and 71a are disposed outside of the perpendicular plate portion 26 of the seat rail 24 and the grooves 61c, 61g, 71c and 71g are formed inside of the perpendicular plate portion 26 of the seat rail 24.

While a preferred embodiment of the invention has been illustrated and described in detail, it will be understood that various changes and modifications may be made in the disclosed embodiment without departing from the scope and spirit of the invention as defined in the appended claims.

What is claimed is:

1. A seat adjuster for a vehicular seat, comprising:
    a rail unit for adjustably sliding the vehicular seat in the fore-and-aft direction, said rail unit including a floor rail fixed on a floor of a vehicle body and a seat rail engaged with said floor rail so as to be slidable in the fore-and-aft direction of the vehicle; and a seat lifting mechanism fixed on said seat rail, said seat lifting mechanism including a lifting drive unit operated according to a request of a seat occupant, a front lifting unit disposed under a front portion of the seat for vertically moving the seat front portion according to the operation of said lifting drive unit, and a rear lifting unit disposed under a rear portion of the seat for vertically moving the seat rear portion according to the operation of said lifting drive unit;

wherein each of said front and rear lifting units includes a shaft member supported to said seat rail and having a supporting link interconnected to the seat, said shaft member having a first stopper integral with said shaft member and a second stopper constituted by a groove portion and a stopping part set to the groove portion, the first stopper being formed by bulging a portion of the shaft member, the stopping part of the second stopper being a stopper ring, a supporting portion of said seat rail being disposed between the bulged portion of the shaft member and the stopper ring.

2. A seat adjuster as claimed in claim 1, wherein the first and second stoppers are formed in the vicinity of an end of the shaft member.

3. A seat adjuster as claimed in claim 1, wherein the shaft members of said front and rear lifting units are located under the seat and is axially rotated according to the operation of said lifting drive unit.

4. A seat adjuster as claimed in claim 3, wherein said seat rail has a perpendicular plate portion extending in the fore-and-aft direction thereof, said perpendicular plate having front and rear through-holes to which said shaft members are supported, respectively.

5. A seat adjuster as claimed in claim 4, wherein said lifting drive unit is fixed to said perpendicular plate portion through a fixing bracket.

6. A seat adjuster as claimed in claim 4, wherein said front and rear lifting unit are fixed to said perpendicular plate portion through front and rear installation members, respectively.

7. A seat adjuster as claimed in claim 1, wherein said lifting drive unit has a front drive motor and a rear drive motor which are movable independently and simultaneously.

8. A seat adjuster for a vehicular seat, comprising:

a rail unit for adjustably sliding the vehicular seat in the fore-and-aft direction, said rail unit including a floor rail fixed on a floor of a vehicle body and a seat rail engaged with said floor rail so as to be slidable in the fore-and-aft direction of the vehicle; and a seat lifting mechanism fixed on said seat rail, said seat lifting mechanism including a lifting drive unit operated according to a request of a seat occupant, a front lifting unit disposed under a front portion of the seat for vertically moving the seat front portion according to the operation of said lifting drive unit, and a rear lifting unit disposed under a rear portion of the seat for vertically moving the seat rear portion according to the operation of said lifting drive unit;

wherein each of said front and rear lifting units includes a shaft member supported to said seat rail and having a supporting link interconnected to the seat, said shaft member having a first stopper integral with said shaft member and a second stopper constituted by a groove portion and a stopping part set to the groove portion, the first stopper being formed by bulging a portion of the shaft member, the stopping part of the second stopper being a push nut, a supporting portion of said seat rail being disposed between the bulged portion of the shaft member and the push nut.

* * * * *